(12) United States Patent
Kawate et al.

(10) Patent No.: US 6,980,407 B2
(45) Date of Patent: Dec. 27, 2005

(54) ARC DETECTION APPARATUS AND METHOD

(75) Inventors: Keith W. Kawate, Attleboro Falls, MA (US); Christian V. Pellon, Norton, MA (US)

(73) Assignee: Texas Instrument Incorporated, Dallas, TX (US)

( * ) Notice: Subject to any disclaimer, the term of this patent is extended or adjusted under 35 U.S.C. 154(b) by 501 days.

(21) Appl. No.: 10/314,715

(22) Filed: Dec. 9, 2002

(65) Prior Publication Data

US 2004/0109269 A1 Jun. 10, 2004

(51) Int. Cl.$^7$ .............................................. H02H 3/00
(52) U.S. Cl. ...................................................... 361/42
(58) Field of Search .......................... 361/42, 49, 93.1, 361/93.6; 340/650; 324/536

(56) References Cited

U.S. PATENT DOCUMENTS

| | | | | |
|---|---|---|---|---|
| 4,694,402 | A | | 9/1987 | McEachern et al. ........... 361/86 |
| 5,229,651 | A | | 7/1993 | Baxter, Jr. et al. ............. 307/86 |
| 5,452,223 | A | | 9/1995 | Zuercher et al. ............. 340/661 |
| 5,578,931 | A | * | 11/1996 | Russell et al. ............... 324/536 |
| 6,229,679 | B1 | * | 5/2001 | Macbeth ...................... 361/42 |
| 6,300,766 | B1 | * | 10/2001 | Schmalz ..................... 624/536 |
| 6,552,509 | B2 | * | 4/2003 | Veltman ...................... 318/807 |
| 6,762,920 | B2 | * | 7/2004 | Parker ........................ 361/93.1 |
| 6,839,208 | B2 | * | 1/2005 | Macbeth et al. ............... 361/42 |

2002/0085327 A1 * 7/2002 Kim et al. ..................... 361/42

* cited by examiner

*Primary Examiner*—Ronald Leja
(74) *Attorney, Agent, or Firm*—Russell E. Baumann; Frederick J. Telecky, Jr.

(57) ABSTRACT

Current flowing through a load is monitored by a transformer (Tr1) having a small mutual inductance. The secondary coil is shorted through a rectifier circuit to deliver a charge which, in a first preferred embodiment, is connected to a log charge translator circuit comprising matching diodes (D9, D7 and D10, D8) and a capacitor (C2) to provide a capacitor voltage proportional to the log of the charge delivered through the rectifier circuit. The capacitor is reset after each measurement. In a modified embodiment, the log translator circuit comprises a pair of transistors (T1, T2) and a capacitor (C2). According to the preferred embodiments, two measurements of the capacitor voltage are taken each half cycle at a time determined by the absolute value of the line voltage. The measurements per half cycle are stored in words in a stack and processed through a three or five cycle algorithm for determining fluctuations which will cancel out disturbances caused by nuisance loads that are repetitive or continuously varying. In a described embodiment, a pushdown stack of 60 words is used with fluctuations compared by a microcontroller to a selected limit. Measurements for the last half second of measurements are considered, ignoring the first and last measurement, and when the sum of the fluctuations exceeds the selected limit an arc is indicated and a circuit interrupter is tripped. A self test button is connected to the microcontroller which, when depressed, results in charging of the capacitor to stimulate the detection of an arc.

16 Claims, 3 Drawing Sheets

$VX=Vt*LN(Q/C/vt+1) \approx vt*LN(Q/C/vt)$

ARC DETECTION APPARATUS AND METHOD

FIELD OF THE INVENTION

This invention relates generally to electrical circuits and more particularly to the detection of arcs and to the tripping of a circuit interrupter upon the detection of such arcs.

BACKGROUND OF THE INVENTION

Arc detection on alternating current (AC) power lines are known in the art. Examples of prior art detectors include U.S. Pat. No. 4,694,402 to McEachern et al.; U.S. Pat. No. 5,229,651 to Baxter et al. and U.S. Pat. No. 5,452,223 to Zuercher et al. McEachern et al. teach the comparison of adjacent cycles to detect waveform disturbances. Baxter et al. teach the comparison of the current cycle to a reference cycle built up from many prior cycles and Zuercher et al. teach the use of cumulative difference signals at predetermined points over many cycles to detect arcs. However, the McEachern et al. and Baxter et al. comparison signals suffer from nuisance tripping caused by varying loads. This limitation is addressed in Zuercher et al. by further analysis of the signal to detect arcs. All three approaches require relatively costly, power-hungry, fast digital processing because a plurality of points per cycle need to be sampled.

SUMMARY OF THE INVENTION

An object of the present invention is the provision of an apparatus and method to detect arcs in a circuit and trip an interrupter to interrupt the circuit while not tripping on nuisance loads, for example, loads normally found in the particular circuit, whether it be residential, commercial, aircraft and the like.

Another object is the provision of an arc detection apparatus which is compact in size, inexpensive to produce and which consumes very little power. Still another object is the provision of an arc detection apparatus having a self-test feature for tripping a circuit breaker. Another object of the invention is the provision of a method for discriminating between wave disturbances caused by nuisance loads such as light dimmers, and arcs which are masked by loads.

Briefly, in accordance with the invention, current flowing through a load is monitored by a weakly coupled transformer, that is, one having a small mutual inductance on the order of approximately 20–50 $\mu H$. The transformer has a primary comprising a few turns serially connected to the load phase and a secondary having a relatively large number of turns, e.g., hundreds of turns, to transfer high frequency components of the primary current. Each end of the secondary, in a preferred embodiment, is connected to the cathode of respective first and second diodes whose anodes are connected to ground. The first and second diodes form half of a full wave rectifier bridge with third and fourth diodes whose cathodes are connected to ground. Fifth and sixth diodes, matched with the third and fourth diodes respectively, are connected to the bridge with their cathodes connected to a capacitor, which in turn is connected to ground. The capacitor is connected to an analog to digital converter of a microcontroller which, after taking a measurement, shorts the capacitor to ground to reset the capacitor to zero volt. Any current that comes from the transformer generates a voltage through the above described diode network that is proportional to the log of the integrated rectified current according to the formula $$V(P2.1) \sim vt * \ln(IQIC/vt + 1 - V(P2.1)/vt)$$

Where
V(P2.1) is the capacitor voltage developed since the last capacitor voltage reset
vt=thermal voltage (kT/q~26 mV at room temperature)
Q is the charge delivered to the diode network
C is capacitance This provides the ability to measure charge from the transformer over a wide dynamic range. The log function also simplifies signal processing and enables the use of a relatively low cost microcontroller rather than a digital signal processor typically used in prior art techniques.

According to the described embodiment, two capacitor voltage measurements, that is the measurement of the log of charge, are taken each half cycle at a time determined by the absolute value of the line voltage. One measurement is taken prior and close to line voltage zero crossing and a second measurement is taken shortly after line voltage zero crossing. The two measurements per half cycle are stored as words in a stack and in one preferred embodiment added together, stored as words in a stack, and then processed through a three cycle algorithm for determining fluctuations which will cancel out disturbances caused by nuisance loads of the type that are repetitive or continuously varying. According to the algorithm, fluctuations are determined by adding words 1 plus 2 (from cycle 1) and words 3 plus 4 (from cycle 3) and subtracting 2 times words 2 plus 3 (from cycle 2). In the described embodiment a push down stack of 60 words is used. The fluctuations of 60 words are compared by a microcontroller to a limit called max_limit. All fluctuations for the last half second of 60 Hz measurements are considered using the three cycle algorithm, ignoring the first and last measurements and then if the sum exceeds the max_limit an arc is indicated and an SCR is fired to trip a circuit interrupter. According to the invention, the three cycles can be overlapping, i.e., only four adjacent half cycles are needed, although six can be used, if desired. In another embodiment, a five cycle algorithm is used to minimize the effects of non-linear variations in the 60 Hz line current, i.e., as found in starting currents of lamps and motors.

According to a feature of the invention, a self test button is connected to the microcontroller which, when depressed, causes the microcontroller to charge the capacitor through a resistor to thereby simulate the detection of an arc.

According to an optional feature of the invention, a small capacitor may be connected in series or parallel with the transformer secondary to respectively increase the rejection of low frequency components or high frequency components, if desired.

According to another optional feature, the log charge translator circuit may be comprised of transistors rather than diodes to simplify the relevant formula.

Other objects, features and advantages of the present invention will be apparent from the following detailed description when taken in conjunction with the accompanying drawings.

DETAILED DESCRIPTION OF PREFERRED EMBODIMENTS

Figure 1:
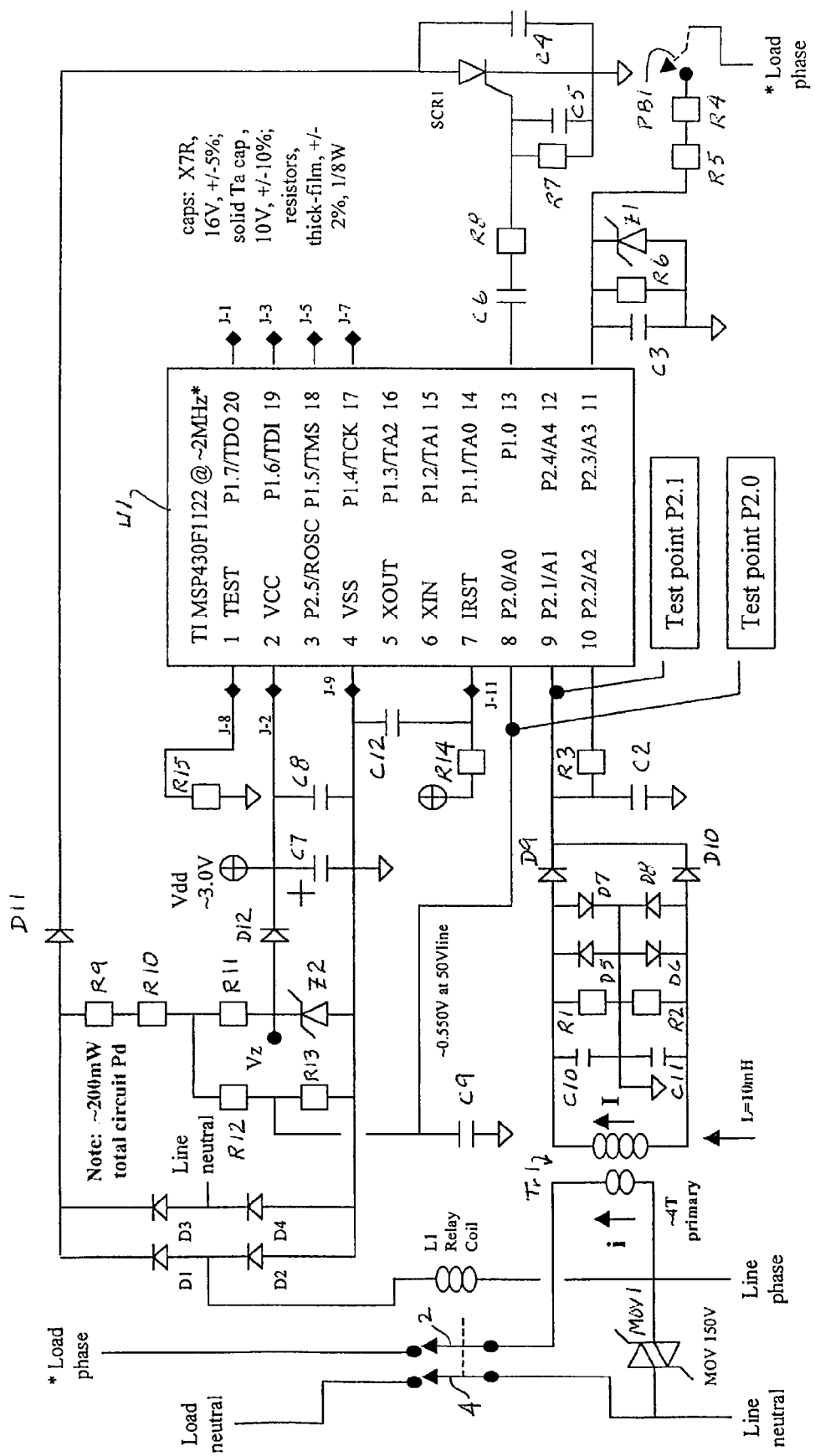
FIG. 1 is a schematic diagram of an arc detection and circuit breaker circuit.

With reference to FIG. 1, relay coil L1 is connected to line phase and is arranged to control the state of energization of main contacts 2, 4 which either connect or separate the main line neutral and line phase to or from the load neutral and load phase line, respectively. Normally, power in the coil is low enough that the relay contacts remain closed. When SCR1 is turned on, however, as will be described, current increases in the relay coil to open the contacts. Metal oxide varistor MOV1 is connected between line neutral and line phase to prevent excessive line voltage.

Current flowing through a load is monitored by a transformer Tr1 comprising roughly three turns of a primary coil and several hundred turns of a weakly coupled secondary coil, that is, a coupling having low mutual inductance on the order of 20–50 micro Henrys, in order to transfer high frequency components of the primary current to the monitoring circuit. The secondary current is rectified and fed to a log charge translator network which includes a capacitor. Starting from a charge of zero volts, the voltage applied across the capacitor is proportional to the log of the charge. A microcontroller is used to take a measurement of the capacitor or log charge in accordance with the preferred embodiment two times each half cycle at times determined by the absolute value of line voltage. The microcontroller resets the capacitor to zero volts following each measurement. This provides a monitored voltage range of measured charge of many orders of magnitude, for example, 6 orders of magnitude.

The use of the log rectified charge translator not only results in the ability to measure charge from the transformer over a wide range, the log function also results in simpler signal processing so that a microcontroller can be used rather than a digital signal processor, a much more expensive device, which would otherwise be required. Since the charge represents current integrated over time, measurement of charge avoids the need for many individual current measurements over a half cycle. Note that adding logarithms is equivalent to but much faster than a multiplication operation. Note also that subtraction of logarithms results in automatic normalization, avoiding the need for a division operation.

Turning back to FIG. 1, the secondary of transformer Tr1 is shown connected to optional capacitors C10, C11, connected between opposite ends of the secondary and ground for providing high pass filtering. If desired, further filtering can be provided by a capacitor (not shown) placed in series with the inductor. Beyond the optional capacitors, C10, C11, a pair of resistors R1, R2 are attached to the transformer circuit and connected to ground to serve as a ground reference for the secondary coil. Diodes D5 and D6, with their anodes connected to ground, are connected to the transformer circuit beyond resistors R1, R2. Following diodes D5 and D6 two more diodes D7 and D8, with their cathodes connected to ground, are connected to the transformer circuit forming a full wave rectified bridge. Another pair of diodes D9, D10 are connected to the transformer circuit with their cathodes connected to capacitor C2. Diodes D9 and D10 are matched to their adjacent diodes D7, D8, respectfully. Diodes D5 and D6 may or may not be matched with other diodes as desired. As noted above, current that is received from the transformer generates a voltage that is proportional to the log of the integrated rectified current. Capacitor C2 is connected to pin 9 of microcontroller U1. In an example of an arc detection and circuit interruption apparatus made in accordance with FIG. 1, U1 is a Texas Instruments microcontroller MSP430F1122 with approximately 2 MHz clock frequency. Pin 9 is connected to a 10 bit analog to digital converter within the microcontroller. Following each measurement made by the microcontroller, pin 9 is shorted internally to ground to prepare the capacitor to integrate current for the next time period, to be discussed.

Pin 10 of microcontroller U1 is connected to resistor R3 which in turn is connected to capacitor C2. This enables the microcontroller to charge capacitor C2 to simulate an arc, to be discussed. Pushbutton PB1 connects the load phase to pin 11. Serially connected resistors R4, R5 as well as resistor R6 connected between pin 11 and ground reduce the line voltage and current to a level suitable for the microcontroller. Although microcontroller U1 has internal protection diodes, zener diode Z1 connected between pin 11 and ground provides redundant 3 volt limitation. Capacitor C3 connected between pin 11 and ground is provided to filter any high frequency noise on the load. When pushbutton PB1 is depressed to initiate a self test, the microcontroller will provide a pulse at pin 10 having a pulse width that varies, the pulse width applying more voltage to the capacitor as the width of the pulse increases to create an arc like signal of varying voltages.

An SCR firing circuit is connected to pin 13 of the microcontroller and comprises SCR1 with a conventional capacitor C4 connected between the anode and cathode of the SCR. Capacitor C5 connected between the gate and cathode of the SCR helps prevent unintentional turn-on of the SCR by high dv/dt. Resistor R7 also connected between the gate and cathode helps to prevent unintentional turn on. Resistor R8 is a current limiting resistor and capacitor C6 serially connected between resistor R8 and pin 13 prevents excessive depletion of the power supply. Diode D11 is connected between a second diode bridge comprising four diodes D1–D4 and the anode of SCR1. When SCR1 is turned on it draws more current through the second diode bridge with close to line voltage applied across coil L1 to trip the breaker. Diode D11 serves to isolate capacitor C4 from the line monitoring circuit connected to pin 8 to be discussed.

Serially connected resistors R9, R10, R11 and zener diode Z2 form part of the power supply for the detection circuit. The resistors limit the amount of current to zener diode Z2. Diode D12 connected between the junction of resistor R11 and zener diode Z2 and VCC pin 2 of microcontroller U1 prevents reverse current flow from capacitor C7 connected between pin 2 and ground in parallel with capacitor C8 providing a 3 volt supply for the microcontroller.

Serially connected resistors R12 and R13 are connected between the junction of resistors R10, R11 and ground. The junction of resistors R12, R13 is connected to capacitor C9, in turn connected to ground, and provides a capacitor voltage that is proportional to the diode bridge D1–D4 voltage. This voltage is approximately equal to the absolute value of the line voltage. The capacitor voltage is connected to pin 8 of microcontroller U1 and is used to determine when to perform the voltage measurements at pin 9.

Resistor R14 and capacitor C12 connected to pin 7 of microcontroller U1, and resistor R15 connected to pin 1 are required by the specific construction of controller U1.

Figure 3:
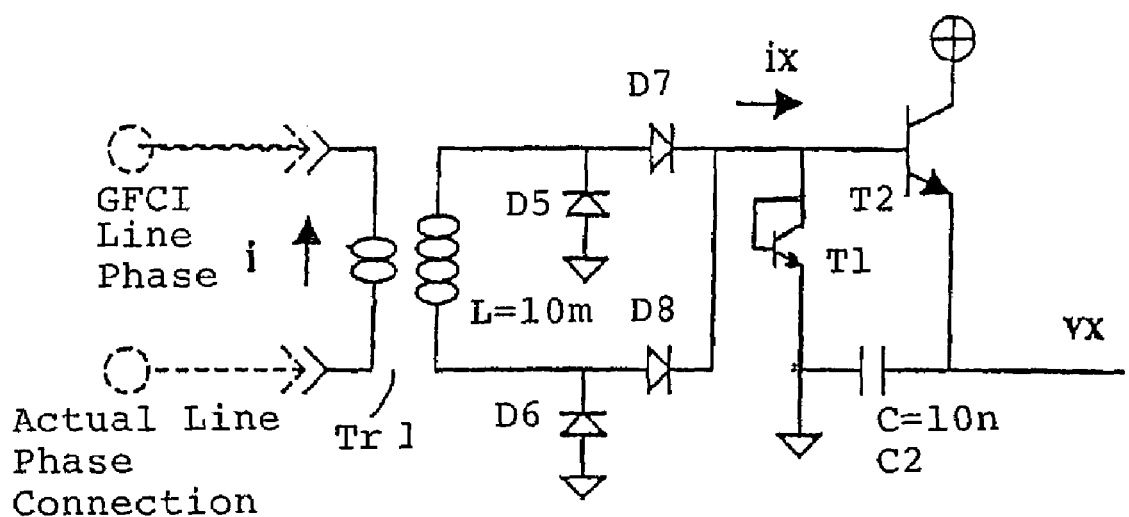
FIG. 3 is a schematic diagram of an alternate log charge translator circuit.

The log charge translator circuit may comprise transistors and a capacitor as well as the matching diodes and capacitor of FIG. 1. FIG. 3 shows an alternate log charge translator circuit with diode connected bipolar transistors T1 and T2. Although the FIG. 3 circuit requires a power supply for transistor T2, as opposed to the diode network of FIG. 1, the capacitor voltage vx=vt*ln (Q/C/vt+1)~vt*ln (Q/C/vt), where vt=thermal voltage=kT/q~26 mV at room temperature, and Q=charge transferred since last capacitor reset. In the FIG. 1 circuit the capacitor voltage vx=vt*ln (Q/C/vt−vx/vt+1)~vt*ln (Q/C/vt). The transistor alternative offers the advantage that the vx/vt term is not present in the relevant formula. However, for Q>>C*vx the circuit operation of the diode network approaches that of the transistor network. While the FIG. 1 diode network is sensitive to ambient temperature through the vt term, microcontroller U1 includes a temperature sensor thereby providing appropriate temperature compensation.

Figure 2:
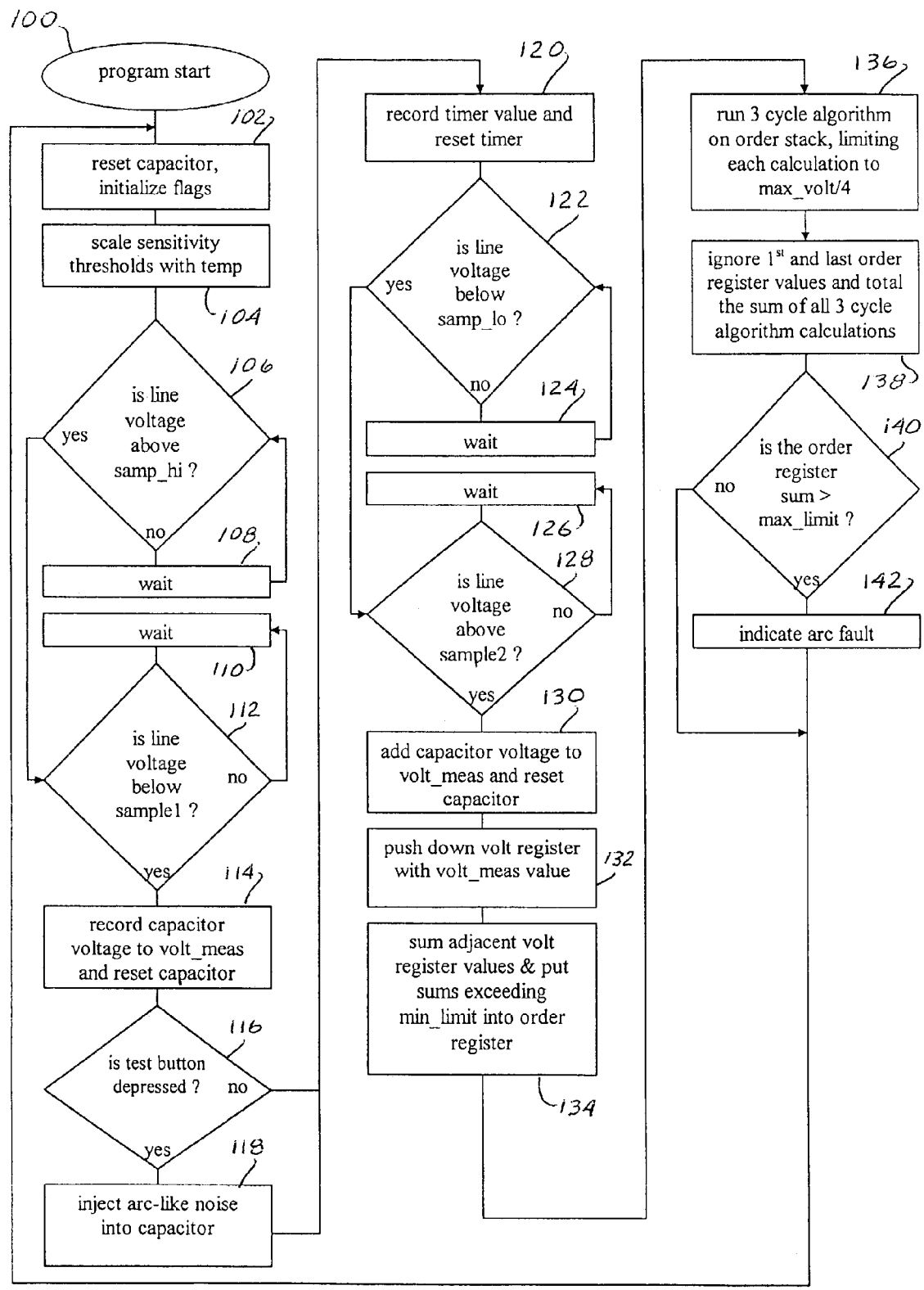
FIG. 2 is a flow chart of the operation of the arc detection and circuit breaker circuit of FIG. 1 according to a preferred embodiment.

Turning to FIG. 2, the program according to a preferred embodiment commences at 100 and at the first step 102, capacitor C2 is reset to zero volts and all the flags are initialized. At step 104 the sensitivity thresholds are scaled with temperature using a temperature sensor provided in microcontroller U1 which provides an output voltage proportional to absolute temperature.

Steps 106–112 form a subroutine in which the program continues to loop until the line voltage, measured on pin 8, exceeds a first selected value, samp_hi and then goes below a second value sample1. This defines one of the measurement points which is taken at step 114 followed by resetting of capacitor C2. The subroutine provides selected hysteresis to avoid having noisy line voltage initiate sampling at an unintended point in time.

If the test button is not depressed, after decision step 116, the program goes on to reset the microcontroller timer at step 120. The timer can be used for monitoring the line-voltage half cycle period to detect certain abnormal line voltage situations whereas the capacitor C2 voltage measurements are determined by the line voltage at pin 8 as discussed above. If test button PB1 has been depressed, at step 118, an arc-like noise is injected into capacitor C2 which, with sufficient noise injected over a plurality of half cycles and processed by an algorithm to be discussed, will cause the circuit breaker to trip in the same manner as a detected arc in the line current.

A second subroutine comprises steps 122–128 in which the program continues to loop until the line voltage goes below a third selected value samp_lo and then exceeds a fourth selected value, sample2. This defines the second point of measurement (step 130) following zero crossing. Since a minimal voltage is required to sustain an arc, e.g., approximately 15 volts, a window typically up to 50 volts is selected for voltage measurement to account for phase differences between line current and line voltage. This window around the zero crossing of the line voltage captures those typically small arcs that are generated or extinguished near the zero crossing.

The first voltage measurement taken at step 114 is added to the second voltage measurement at step 130 and capacitor C2 is then reset. The resulting value is entered into a pushdown register at 132 and at step 134 the program sums adjacent voltage register values and puts these sums exceeding a minimum, min_limit, into another register. The sums eliminate any diode effect caused by any dependence of load current magnitudes upon line voltage polarity. The minimum is used to restrict register values to those above a selected value.

At step 136, a 3 cycle algorithm is calculated. The word of cycle 1 plus the word of cycle 3 minus two times the word of cycle 2 is calculated and the absolute value taken. These adjacent full cycles could be overlapping or not, as desired. Note that if these 3 cycles are not overlapping, 6 half cycles are required for the calculation, and if these 3 cycles are overlapping, then only 4 half cycles are needed.

At step 138, the first and last register values are ignored to prevent a single event from having too much influence on the results, e.g., an event caused by switching a light off or on (decision step 140). The 3 cycle algorithm is applied to the remaining register values for the last half second, and if the sum of the 3 cycle algorithm calculated is greater than a selected value max_limit, a fault is indicated at step 142.

When the sum exceeds the max_limit value, SCR1 is fired. This is repeated three times to ensure firing even with a brief interruption of line voltage. A selected pulse, e.g., 30 micro second pulse is provided to the SCR.

If desired, separate registers could be used to record the first two measurements rather than summing them into a single register as described above. The algorithm could then be applied to each register separately.

As noted above, an overlapping three cycle algorithm requires four half cycles of information. This algorithm calculates the absolute value of signal (1) minus 2 times signal (2) plus signal (3). This algorithm eliminates contributions to the fluctuation from signal (t)=a+b*t variation over time. Higher-order odd powers of t are eliminated, however not even powers equal to or greater than $t^2$.

A five cycle algorithm can be used to eliminate contributions to the fluctuation from signal (t)=a+b*t+c*t^2 variation over time. This algorithm calculates the absolute value of signal (1) minus 4 times signal (2) plus 6 times signal (3) minus 4 times signal (4) plus signal (5). Higher-order odd powers of t are eliminated, however not even powers equal to or greater than $t^4$.

It will be understood that if desired, the algorithms described in the previous two paragraphs could be used with a single measurement or any selected plurality of measurements each half cycle, the term signal referring to the composite value for each cycle, whether overlapping or adjacent.

An arc detection and circuit interrupter apparatus made in accordance with FIG. 1 has the following components:

| | Component |
|---|---|
| U1 | TI MSP430F1122 @ ~ 2 MHz |
| C2 | 10 nF |
| C3 | 10 nF |
| C4 | 10 nF |
| C5 | 33 nF |
| C6 | 100 nF |
| C7 | 10 uF |
| C8 | 100 nF |
| C9 | 10 nF |
| C10 | 2.2 nF |
| C11 | 2.2 nF |
| C12 | 10 nF |
| R1 | 10K ohms |
| R2 | 10K ohms |
| R3 | 33K ohms |
| R4 | 100K ohms |
| R5 | 100K ohms |
| R6 | 100K ohms |
| R7 | 3.3K ohms |
| R8 | 470 ohms |
| R9 | 22K ohms |
| R10 | 22K ohms |
| R11 | 22K ohms |
| R12 | 100K ohms |

-continued

| Component | |
|---|---|
| R13 | 3.3K ohms |
| R14 | 33K ohms |
| R15 | 33K ohms |
| D1 | IN4005 |
| D2 | IN4005 |
| D3 | IN4005 |
| D4 | IN4005 |
| D5 | MMBD1505A |
| D6 | MMBD1505A |
| D7 | MMBD1505A |
| D8 | MMBD1505A |
| D9 | MMBD1505A (Match D7) |
| D10 | MMBD1505A (Match D8) |
| D11 | IN4005 |
| D12 | IN4148 |
| Z1 | BZX84-B3V3 |
| Z2 | BZX84-B3V3 |
| Tr1 | L = 10 mH, M = 30 $\mu$H |
| SCR1 | |

It will be understood that the invention is not limited to the particular embodiments set forth herein as illustrative, but embraces all such modified forms thereof as come within the scope of the following claims.

What is claimed:

1. An arc fault circuit interrupter comprising
a transformer having a primary winding for connection to line current and a weakly coupled secondary winding,
a rectifier circuit connected to the secondary winding, the rectifier circuit connected to a translator circuit, said translator circuit having a capacitor whose voltage is proportional to the logarithm of the charge delivered by the rectifier circuit,
a microcontroller having inputs and outputs, the capacitor being connected to an input of the microcontroller for measuring said capacitor voltage and to an output for resetting the capacitor voltage,
a line voltage detection circuit for generating a signal proportional to line voltage, the line voltage detection circuit connected to an input of the microcontroller to enable the microcontroller to take measurements of the capacitor voltage at selected absolute values of the line voltage, the microcontroller generating an output responsive to the measured capacitor voltage, said output providing an indication of the existence of an arc fault.

2. An arc fault circuit interrupter according to claim 1 in which the mutual inductance of the transformer is on the order of 20–50 $\mu$H.

3. An arc fault circuit interrupter according to claim 1 in which the rectifier circuit is a full wave diode bridge, the bridge having outputs which are shorted together and further comprising additional diodes connected to the rectifier circuit for generating the capacitor voltage.

4. An arc fault circuit interrupter according to claim 1 in which the rectifier circuit is a full wave diode bridge and further comprising transistors connected to the rectifier circuit for generating the capacitor voltage.

5. An arc fault circuit interrupter according to claim 1 in which the capacitor voltage is zero with zero rectified charge.

6. An arc fault circuit interrupter according to claim 1 further comprising a pushbutton switch connected between a load phase and an input of the microcontroller and a resistor is connected between a test output of the microcontroller and the capacitor, the pushbutton when depressed inputting a signal to the microcontroller to charge the capacitor through the resistor to inject an arc like signal and enable the microcontroller to generate an arc detecting signal.

7. An arc fault circuit interrupter having a circuit for generating a signal that increases approximately with the logarithm of a rectified charge delivered by a transformer connected to line current, said signal measured at times determined by line voltage in a first window including line voltage zero crossing and in another window not including the zero crossing, the method comprising the steps of adding the signal measurements over a cycle,
calculating the fluctuation over at least a selected number of cycles,
summing fluctuations over another selected number of cycles,
comparing the fluctuation sum to a predetermined threshold, and
generating an arc detection signal when the fluctuation sum exceeds the threshold.

8. A method according to claim 7 in which the step of calculating the fluctuation of the signals includes taking four half cycles, summing adjacent half cycles to generate three values, and calculating the absolute value of value (1) minus 2 times value (2) plus value (3).

9. A method according to claim 7 in which the step of calculating the fluctuation of the signals includes taking six half cycles, summing adjacent half cycles to generate five values, and calculating the absolute value of value (1) minus 4 times value (2) plus 6 times value (3) minus 4 times value (4) plus value (5).

10. A method according to claim 8 in which the measured signal is zero with zero rectified charge.

11. A method according to claim 8 in which the window that includes the zero crossing of the line voltage also includes line voltages that exceed a minimum arc sustaining voltage.

12. An arc fault circuit interrupter having a circuit for generating a signal related to line current twice every half cycle of line voltage, the method comprising the steps of
taking a signal measurement in a first window prior to and close to line voltage zero crossing and a signal measurement after and close to line voltage zero crossing in each half cycle,
storing the sum of the measurements in each full cycle as a word in a push down stack,
taking three consecutive words, words 1–3, and calculating the absolute value of word 1 plus word 3 minus two times word 2 to determine fluctuations of the signals,
storing the fluctuations,
repeating the same calculations for other sets of three consecutive words,
summing the fluctuations of a selected number of words,
comparing the summed fluctuations with a predetermined threshold to determine the occurrence of an arc fault, and
generating an arc fault signal when the summed fluctuations exceed the predetermined threshold.

13. A method according to claim 12 in which the words are derived from overlapping cycles.

14. A method according to claim 12 in which the words are derived from adjacent cycles.

15. An arc fault circuit interrupter having a circuit for generating a signal related to line current every half cycle of line voltage, the method comprising the steps of
taking signals 1–4 in four adjacent half cycles, calculating the absolute value of signal 1 minus signal 2 minus signal 3 plus signal 4 in the four adjacent half cycles, repeating the same calculations for other sets of four adjacent half cycles, summing the above calculations of at least a selected plurality of sets of four adjacent half cycles to determine the fluctuations of the signals, comparing the sum of the calculations of said at least a selected plurality of sets of four half cycles to a predetermined threshold to determine the occurrence of an arc fault, and generating a signal when the summed calculations of said at least a selected plurality of sets of four half cycles exceeds the predetermined threshold whereby the method is relatively less sensitive to repetitive and continuously varying signals indicative of normal loads and relatively more sensitive to chaotic arc signals.

16. An arc fault circuit interrupter having a circuit for generating a signal that increases approximately with the logarithm of a rectified charge delivered by a transformer connected to line current, said signal measured at least once each half cycle, the method comprising the steps of adding the signal measurements over a cycle, calculating the fluctuation over at least a selected number of cycles, summing fluctuations over another selected number of cycles, comparing the fluctuation sum to a predetermined threshold, and generating an arc detection signal when the fluctuation sum exceeds the threshold.

* * * * *